United States Patent [19]
Ekman et al.

[11] Patent Number: 5,960,355
[45] Date of Patent: Sep. 28, 1999

[54] METHOD AND AN ARRANGEMENT RELATING TO TELECOMMUNICATION SYSTEMS

[75] Inventors: Kenneth Ekman; Anders Hedlund; Rikard Lundqvist, all of Skellefteå; Walter Ghisler, Uuplands Väsby, all of Sweden

[73] Assignee: Telefonaktiebolaget LM Ericsson, Stockholm, Sweden

[21] Appl. No.: 08/799,039

[22] Filed: Feb. 10, 1997

Related U.S. Application Data

[60] Provisional application No. 60/011,829, Feb. 16, 1996.

[30] Foreign Application Priority Data

Feb. 16, 1996 [SE] Sweden ................................. 9600577

[51] Int. Cl.⁶ ..................................................... H04Q 7/20
[52] U.S. Cl. ............................................ 455/456; 455/524
[58] Field of Search ..................................... 455/422, 456, 455/457, 435, 502, 503, 517, 524; 342/450, 452, 457; 701/207

[56] References Cited

U.S. PATENT DOCUMENTS

| | | | |
|---|---|---|---|
| 5,293,645 | 3/1994 | Sood | 455/54.1 |
| 5,608,410 | 3/1997 | Stilp et al. | 342/387 |
| 5,629,710 | 5/1997 | Sawada | 455/456 |
| 5,646,632 | 7/1997 | Khan et al. | 455/524 |
| 5,809,424 | 9/1998 | Eizenhoefer | 455/456 |

FOREIGN PATENT DOCUMENTS

WO92/05672  4/1992  WIPO.
WO95/26510  10/1995  WIPO.

OTHER PUBLICATIONS

International–Type Search Report re: SE96/00156 Date of mailing of Report: Oct. 25, 1996.

*Primary Examiner*—Reinhard J. Eisenzopf
*Assistant Examiner*—Sam Bhattacharya
*Attorney, Agent, or Firm*—Burns, Doane, Swecker & Mathis, L.L.P.

[57] ABSTRACT

The present invention teaches a method, system, terminals and service node for geographically positioning a first mobile radio terminal (MS1) within a radio network (100) comprising unsynchronised radio base stations by using a plurality of second fixed radio terminals (MS2) whereby the positions of the radio base stations and the second fixed radio terminals are known. First and second radio terminals (MS1,MS2) measure the relative receive times between the timing signals downlink (113–118) received from at least three radio base stations (BS1,BS2,BS3) and the second fixed radio terminals (MS2)send them to a service node (107) in the network (100) using them for calculating the transmission time offsets of the timing signals downlink. Calculating the position of the first mobile radio terminal (MS1) is performed either in the service node (107) in the network (100) or in the terminal (MS1) itself, after respectively sending relative receive time measurements from the first mobile radio terminal (MS1) to the service node (107), or broadcasting transmission time offset values and known positions from the service node (107) to the first radio terminal (MS1) to be positioned.

42 Claims, 9 Drawing Sheets

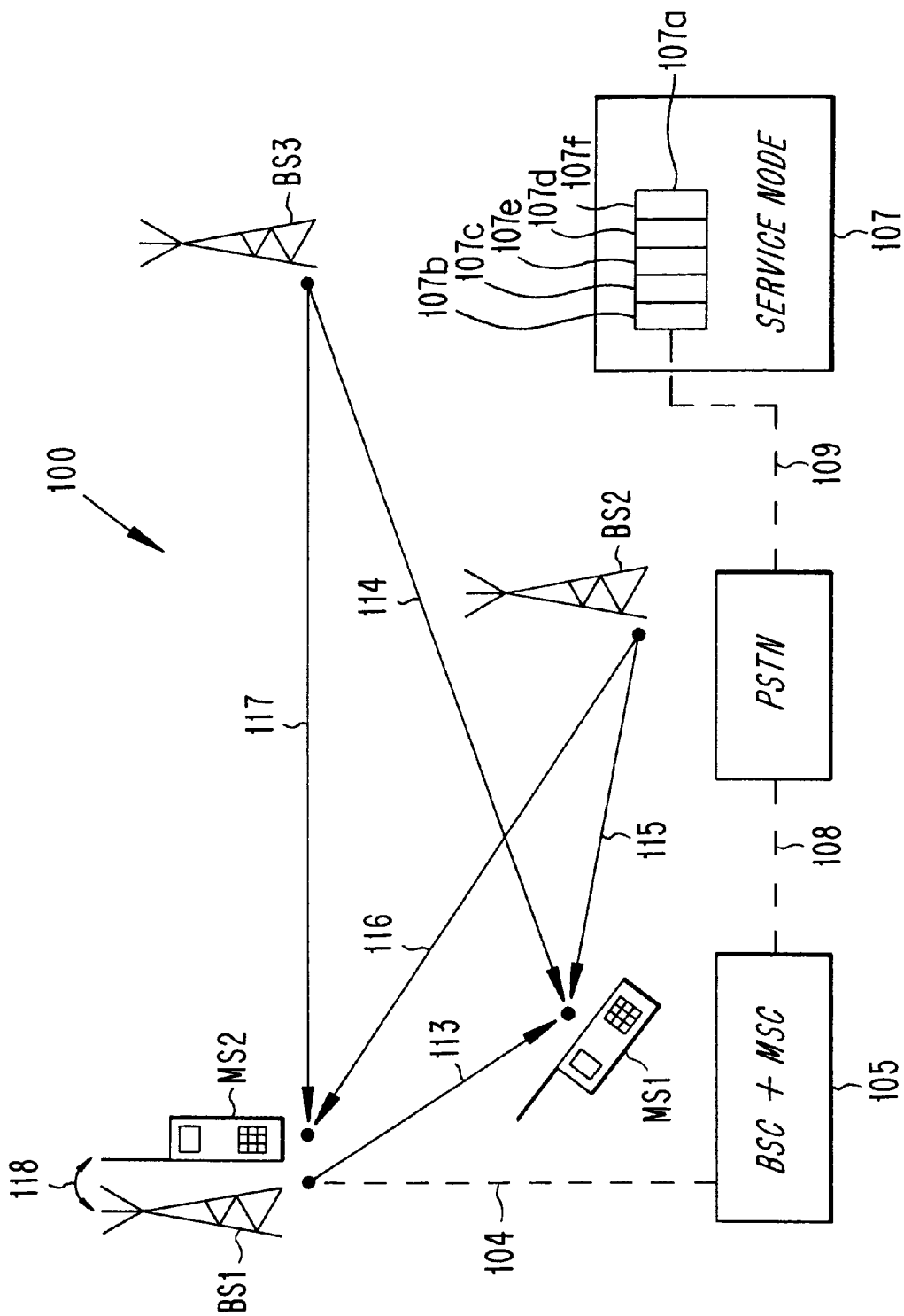

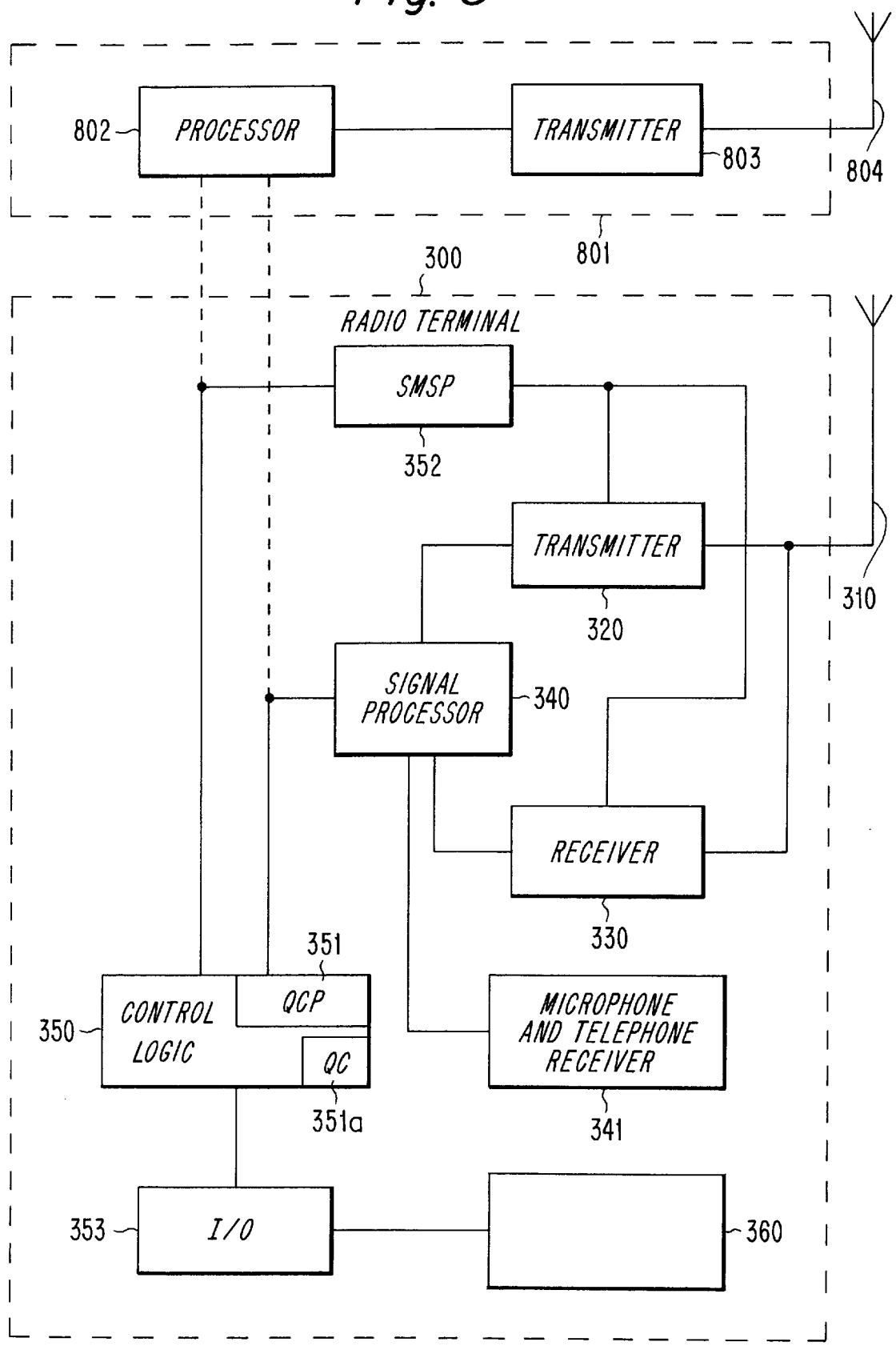

METHOD AND AN ARRANGEMENT RELATING TO TELECOMMUNICATION SYSTEMS

This application claims benefit of provisional application No. 60/011,829 filed Feb. 16, 1996.

TECHNICAL FIELD OF THE INVENTION

The present invention relates to radio communication systems having a number of radio base stations each communicating with mobile radio terminals and in particular to a method in such systems for determining the geographical position of a mobile radio terminal.

DESCRIPTION OF RELATED ART

There are many occasions when it is desirable to determine the geographical position of mobile radio terminals.

One prior art system for this purpose is described in U.S. Pat. No. 5,293,645 A. According to this U.S. patent a plurality of radio base stations transmit synchronised timing reference signals. A radio terminal that is to be positioned measures the relative propagation delays between the timing reference signals from at least three radio base stations and reports these measurements to the land system. A processor in the land system calculates the position of the mobile radio terminals. Since present day cellular systems generally do not have synchronised radio base stations the method described has the disadvantage of needing major modifications to the concerned cellular systems. A method would instead be desirable not requiring synchronisation between radio base stations. The U.S. patent mentions a possible embodiment where timing reference signals from radio base stations have a known predefined time offset but are synchronised. However, it would be preferable not to have a requirement of synchronising at all in order to use present day cellular land systems as they are. A further disadvantage of the method described in the U.S. patent is the fact that reporting of measurements to the land system and calculating the geographical position of mobile radio terminals in the land system is the only method described whereas it would be desirable to have the option of performing the positioning calculation in the mobile radio terminal itself.

Another prior art system is the well known Global Positioning System GPS which uses several satellites for transmitting time reference signals. It has the advantage of using only downlink information streams but as in the afore mentioned U.S. patent the signal sources in GPS are synchronised. Calculations are performed in the mobile radio terminal.

Another prior art system is described in the published patent application DE 4409178 A1. This application teaches how to calculate the geographical position of a mobile radio terminal in the terminal itself by determining the distances to three nearby radio base stations in said radio base stations making use of the time alignment TA and sending the results to said terminal which then calculates its position from known positions of the radio base stations and associated distances. Even other alternative methods are mentioned but not described in detail.

SUMMARY OF THE INVENTION

One problem on which the present invention focuses is how to make use of not synchronised radio base stations in present day cellular systems for determining the geographical position of mobile radio terminals. The present day radio base stations have slightly different clock frequencies and the timing messages sent periodically from the radio base stations are of the same duration but offset in time relative to each other. Furthermore, these offsets vary slowly as a function of time due to the slightly different frequencies.

Another problem addressed by the present invention is how to determine the geographical position of mobile radio terminals without the need of uplink transmission streams from these mobile radio terminals to the radio base stations of a radio communication system that comprises unsynchronised radio base stations.

Another problem addressed by the present invention is how to find the serving radio base station of a mobile radio terminal that is to be positioned, since mobile radio terminals may be registered in a location area including typically 50 radio base stations whereby the land system does not keep for idle mobile radio terminals a record of the serving radio base station among the typically 50. The algorithm used for positioning a mobile radio terminal needs to know at least one radio base station near the terminal in order to decide which at least three radio base stations to use for the positioning algorithm.

Still another problem addressed by the present invention is how to obtain the desired accuracy of measurement when positioning a mobile radio terminal. The requirement for accuracy may e.g. vary depending on the environment of the mobile terminal to be positioned.

It is therefore an object of the present invention to provide a method and an apparatus for determining the geographical position of mobile radio terminals that are in an on-state (i.e. idle or during a call) in an area with radio coverage from at least three radio base stations transmitting timing signals downlink which do not need to be and in general are not synchronous.

It is a further object of the present invention to provide a method and an apparatus for determining the geographical position of mobile radio terminals as stated in the previous paragraph but further to said timing signals downlink using up and downlink messages and performing the calculations in a service node in the land system.

It is a further object of the present invention to provide a method and an apparatus for determining the geographical position of mobile radio terminals as stated in the last but one paragraph but further to said timing signals downlink using only downlink transmission of messages and making the position calculations in the mobile radio terminals.

It is a further object of the present invention to provide a method and an apparatus for making first a less accurate positioning of a mobile radio terminal followed by making a more accurate positioning.

It is a further object of the present invention to provide a method and an apparatus for achieving a varying accuracy of positioning required for varying applications.

The present invention provides a method and a system including an inventive radio terminal and inventive service node to solve the described problems of determining the geographical position of a first mobile radio terminal, by making use of a second radio terminal, the positions of radio base stations and of the second radio terminal being known. The first and second radio terminals measure the relative receive times between the timing signals downlink received from at least three radio base stations and the second radio terminal sends its measured relative receive times to a service node in the network which uses them for calculating the transmission time offsets of the timing signals downlink. Calculating the position of the first mobile radio terminal is then performed either in the service node in the network or in the first mobile radio terminal itself, after respectively sending relative receive time measurements from the first mobile radio terminal to the service node, or broadcasting transmission time offset values and known positions from the service node to the first mobile radio terminal.

In one embodiment the radio terminals considered are standard radio terminals in the GSM system (Global System for Mobile Communication). The first mobile radio terminal synchronises itself to the serving radio base station in order to receive any pages if in idle mode or in order to communicate on a traffic channel if in dedicated (i.e. conversation) mode. In any of the two modes the first mobile radio terminal will read the Frequency Correction Channel FCCH and then the Synchronisation Channel SCH of at least two other surrounding radio base stations thus receiving their identities and the first mobile radio terminal will also read from its so called Quarter-Bit-Counter QC the relative receive times relative to the first mobile radio terminal and therefore relative to the serving radio base station to which the first mobile radio terminal is synchronised. The first mobile radio terminal will then report (uplink) these identities and measurements to a service node via the serving radio base station. The service node will try to calculate the position of the first mobile radio terminal using known radio base station positions but will have the unknown relative transmission time offsets between the radio base station's timing signals downlink as unknown variables in the result. These unknown variables are determined by a second radio terminal for which the geographical position is known. The second radio terminal performs measurements on the same timing signals downlink of the same radio base stations and reports the measurements as the first mobile radio terminal does.

In another embodiment, again assuming the GSM system, measurements are performed as in the previous embodiment, but only the measurements made by the second radio terminal are reported (uplink) to the service node in the network. The service node calculates transmission time offsets and sends them to some of the radio base stations and these in turn broadcast them, together with radio base station identities and time stamps to first mobile radio terminals using e.g. in the GSM system downlink information on the Cell Broadcast Channel CBCH or, a System Information Message on the Broadcast Control Channel BCCH, in order to allow the first mobile radio terminals to calculate their positions themselves. The measurements of the relative transmission time offsets are time stamped, because they are a function of time since at least some radio base stations are supposed not to be in synchronism. To reduce the need of frequent measurements the invention provides that the first derivatives relative time of the transmission time offsets may also be determined and used. This enables first mobile radio terminals to extrapolate transmission time offsets from the time they were determined to the time they are used to calculate a position. It is known that radio terminals have a clock for the necessary reading of elapsed time.

In a further embodiment of the invention the second radio terminal repeats its measurements periodically, time-stamps the measurement and adds the time-stamps to the measurements when sending them to the service node. This enables the service node to improve the accuracy of the positioning by extrapolating the transmission time offsets to the actual time of the calculation by making use of their first derivatives and of the time elapsed since the measurements where made.

In a further embodiment of the present invention the second radio terminal (as examplified in FIG. 1) is placed on the site of a radio base station which will simplify the acquisition of geographical data as to the position of this second radio terminal when compared to the case of a free-standing second radio terminal.

In a still further embodiment of the present invention the service node is a node in the wire-bound network and handles the calculations for a plurality of mobile radio terminals. It may send the calculated results to the first mobile radio terminal, i.e. the terminal that has been positioned.

One advantage of the present invention is that the inventive positioning method may be applied to systems with or without synchronisation between radio base stations thereby being applicable to present day cellular mobile radio systems.

Another advantage is that no hardware modifications are required in the radio base stations and not in the radio terminals if an embodiment with a service node in the GSM land system is considered (GSM=Global System for Mobile Communication). The addendum required by the invention lies merely in identical programs to be down-loaded into a standard GSM radio terminal (said first mobile radio terminal) wanting to perform determination of its position and into a standard GSM radio terminal used as the reference radio terminal (said second radio terminal). The service node involved in the function is an addition in both hardware and software. Additional hardware may also be used to increase the resolution of the so called Quarter Bit Counter QC described later, but at the price of the radio terminal becoming non-standard.

Another advantage is that the inventive positioning method is equally applicable during a call or in idle mode. This may be important in critical Situations like e.g. a police action.

Still another advantage is that radio base stations of both the own operator and other operators may be used in the locating process. Also dummy radio base stations may be used which do not carry any traffic but have a carrier for the required downlink control channel function, thereby improving accuracy locally.

A further advantage of the present invention is that geographical positioning of mobile radio terminals is possible in environments like a forest or outdoors downtown or anywhere indoors where e.g. the weaker signals of the afore mentioned Global Positioning System GPS cannot be received. The signals of a ground based radio system are stronger than the signals of the satellite based GPS system and therefore the inventive system may be, in inhabited regions, an alternative to the satellite based GPS system.

The invention will now be described in more detail referring to several embodiments and to the attached drawings.

BRIEF DESCRIPTION OF THE DRAWINGS

FIG. 1 shows schematically a positioning system according to the invention in a radio network.

FIG. 8 shows schematically a fixed radio terminal consisting of a beacon type radio base station.

DETAILED DESCRIPTION OF EMBODIMENTS

Figure 2A:
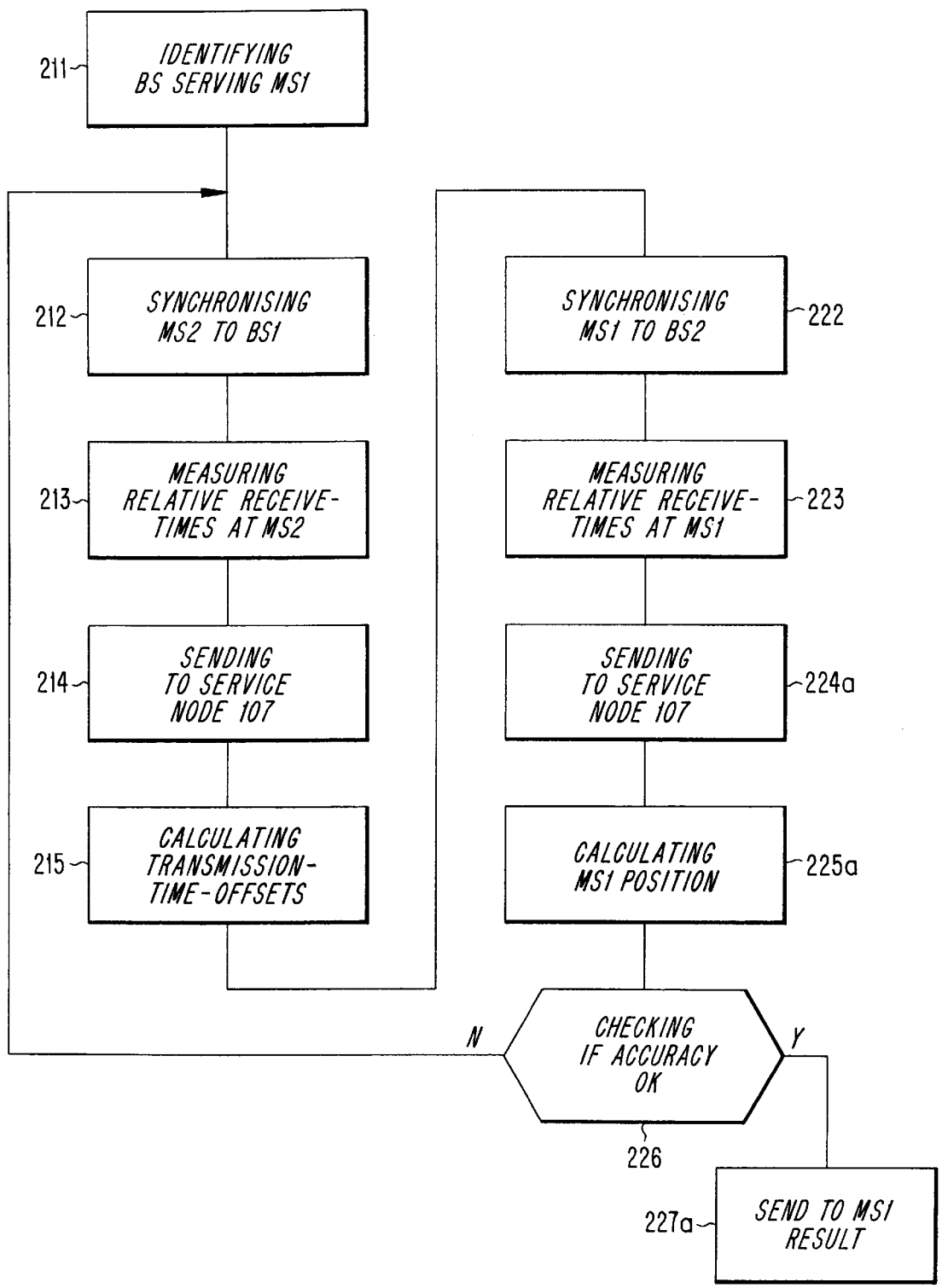
FIG. 2a is a flow chart for a first embodiment of the inventive method applicable to the positioning system of FIG. 1.

FIG. 1 shows schematically a positioning system 100 in a radio network according to the invention. The network has a plurality of radio base stations of which three are shown BS1, BS2,BS3. The radio base stations are connected to a wire-bound network via communication links of which only one 104 is shown as a dashed line whereas similar not shown connections exist also from the radio base stations BS2 and BS3 to the wire-bound network which network may consist e.g. of a Base Station Controller BSC and an associated Mobile Services Switching Centre MSC as illustrated by block 105 connected in turn to the Public Switched Telephone Network PSTN and to a service node 107. The dashed connections 108 and 109 are trunk connections.

In the service node 107 there is a processor 107a that includes a unit for receiving 107b, storing 107c, sending 107d and first 107e and second 107f calculating units. The first calculating unit 107e calculates transmission time offsets of the timing signals downlink sent by the radio base stations. The second calculating unit 107f calculates the position of mobile radio terminals. The storing unit 107c holds the known positions of radio base stations and fixed radio terminals. The receiving unit 107b and the sending unit 107d provide the communication with first and second radio terminals MS1,MS2 using Short Message Service SMS known to those of ordinary skill in the art. This communication includes measurement results provided by the radio terminals, requests by the service node to the terminals and vice-versa, transmission time offsets and position results provided by the service node 107 to the terminals MS1, as will be understood from the flow charts of FIGS. 2a, 2b, and 4. FIG. 1 refers to an implementation in the Global System for Mobile communication GSM but the wire-bound network may alternatively consist of radio base stations connected directly to the PSTN and a service node, such as would be the case for a land mobile radio system.

FIG. 1 shows also a first mobile radio terminal MS1 the position of which is to be calculated and a second radio terminal MS2 the position of which is known e.g. by placing it at one of the radio base stations since the positions of the radio base stations are known anyway in the calculations according to the present invention.

FIG. 1 shows also radio links 113, 114, 115 as solid lines associated with the mobile radio terminal MS1 and the three radio base stations as well as radio links 116, 117, 118 as solid lines associated with the radio terminal MS2 and the three radio base stations. The fact that link 118, as the only radio link, has been shown bi-directional by having two arrows, indicates that MS2 must always have one uplink connection in order to report on its measurements whereas all other radio connections are shown as downlink connections only. For the case the calculations for determining the position of the mobile radio terminal MS1 are partly performed in MS1 itself there is no need for MS1 to have any uplink connections. If instead the calculations are performed completely in the service node 107 also MS1 needs an uplink connection (arrow not shown) to report its measurements to the service node 107.

Figure 2B:
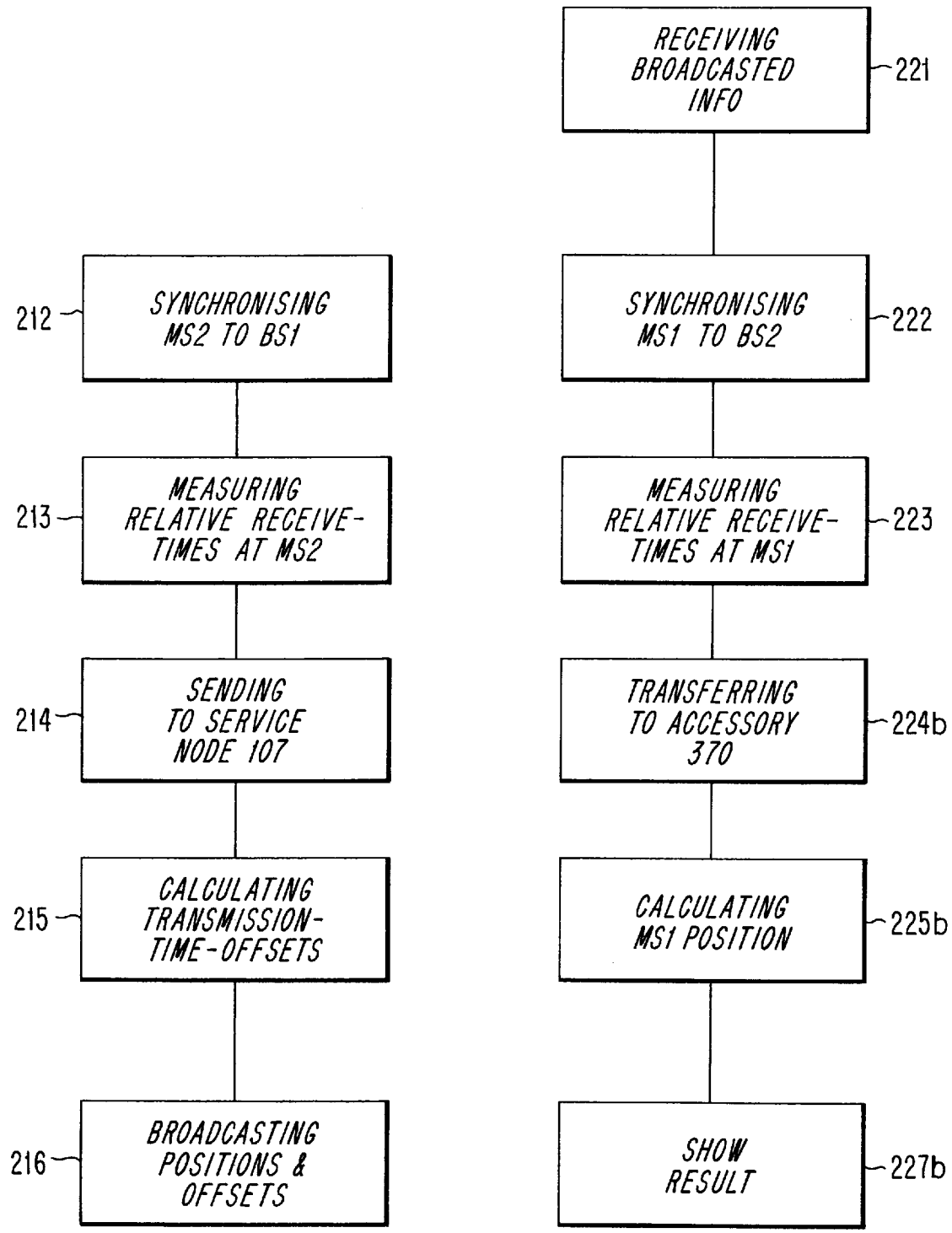
FIG. 2b is a flow chart for a second embodiment of the inventive method applicable to the positioning system of FIG. 1.

FIGS. 2a and 2b show flow charts explaining the inventive method step by step whereby reference is made to the block diagram of FIG. 1. FIG. 2a refers to the case where all calculations are made centrally in a service node 107 whereas FIG. 2b refers to the case where the mobile radio terminal MS1 to be positioned performs the positioning calculations itself.

FIG. 2a is a flow chart for a first embodiment of the inventive method applicable to the positioning system of FIG. 1. In step 211 of FIG. 2a an identification of a radio base station serving the mobile radio terminal MS1 is performed. A subscriber with the mobile radio terminal MS1 has earlier sent a message to the service node 107 acting as one calculating point of the positioning system e.g. by using the Short Message Service SMS available in the Global System for Mcbile Communication GSM. In the message there is a request to the positioning system to provide positioning information of mobile radio terminal MS1 and to provide this information periodically to MS1, once an hour for e.g. 24 hours, because the subscriber plans to travel a long distance by car and wants to regularly know the current position. He/she keeps the mobile radio terminal MS1 switched on in order to receive the positioning service. If the mobile radio terminal MS1 is in an idle mode when positioning is performed the serving radio base station will in many mobile radio systems not be known to the land system because the individual serving radio base station is often selected by the mobile radio terminal but not reported to the land system. The purpose for the mobile radio terminal of selecting and listening to a serving radio base station in idle mode is to enable the land system to contact the mobile radio terminal in case of an incoming call resulting in a page. But a page is often performed by paging the wanted terminal in a whole location area having typically 50 radio base stations as mentioned earlier and the serving radio base station is not known when paging. However, the positioning system needs to know the identity of the serving radio base station in order to request measurements from the mobile radio terminal MS1 and in order to specify which surrounding radio base stations to include in the measurements. The service node 107 will therefore start the hourly measurements of this embodiment by sending via the short message service SMS a first message to the mobile radio terminal MS1 ordering it to scan a specified set of frequencies, perform the signal strength measurements associated with this scanning, report the results via an SMS message to the service node and also include the identity of the serving radio base station in the message. The mobile radio terminal MS1 is programmed to answer this request without the subscriber being aware of it, i.e. no alert occurs. Knowing this identity, the service node 107 will select the other radio base stations and the (those) radio terminal(s) MS2 that shall take part in the (time-) measurements. A request to measure and report the measurements is then sent by a second SMS message to the radio terminal MS1 and to the terminal(s) MS2. The measurements made by the terminal(s) MS2 are either made and reported on a predetermined periodic bases, or event driven, on request from the service node 107.

In steps 212 and 213 the radio terminal MS2 synchronises to its serving radio base stations BS1, measures the relative receive times of the timing signals downlink 116,117 when received by MS2. The details of these steps are explained further down referring to FIG. 4.

In step 214 the radio terminal MS2 sends to the service node 107 the relative receive times of BS2 and BS3 referring to BS1 receive time as well as the identities of radio base stations BS1,BS2,BS3 and the frame numbers read on the Synchronisation Channel SCH of BS1, BS2, BS3. In a mobile radio network there may be many radio terminals MS2 sharing the work of steps 212,213,214. It is also possible to repeat measurements and to average results in order to increase accuracy.

In step 215 the service node 107 calculates the transmission time offsets of the radio base stations BS2 and BS3 relative BS1 and registers the results under the corresponding identities. This is done by subtracting from the measured relative receive times the time it takes for the signal to travel from the respective radio base station to the radio terminal MS2 i.e. subtracting the known distance radio base station to radio terminal MS2 divided by the speed of light. This will be fully understood from the discussion of FIGS. 5 and 6.

In steps 222,223, analogue to steps 212,213 the mobile radio terminal MS1 performs the measurements that have been requested by the service node 107 in step 211, i.e. it measures the relative receive times of the radio base stations BS1, BS3 as compared to its serving radio base station BS2.

In step 224a, analogue to step 214 the mobile radio terminal MS1 sends to the service node 107 the measurements made in step 223.

In step 225a the service node processor 107a calculates with its program the position of the mobile radio terminal MS1 as will be explained in detail referring to FIGS. 5 and 6.

In step 226 the service node 107 checks if an accuracy requirement is met. If this is the case (Y), in step 227a the result of the calculations is shown on an output device of the service node 107 or sent to the mobile radio terminal MS1 for displaying e.g. on a liquid crystal display.

If instead the accuracy is not considered sufficient (N), the service node 107 selects a new set of radio base stations. This selection may comprise radio base stations which are nearer to the mobile radio terminal MS1, or some radio base stations which are synchronised between each other or just a few more radio base stations. Then the steps starting at step 212 are repeated. If using the possibility to have some radio base stations synchronised the calculations are simplified because the fixed radio terminals MS2 may be placed in preference at the sites of these synchronised radio base stations thus MS2 radio terminals using these radio base stations as serving radio base stations and therefore becoming synchronous also between each other.

FIG. 2b is a flow chart for a second embodiment procedure applicable to the positioning system of FIG. 1.

Steps 212 through 215 and 222, 223 are identical to the corresponding steps of FIG. 2a whereas the other steps of FIG. 2b are explained in the following.

In step 216, information required for calculating positions of mobile radio terminals is broadcasted on channels of radio base stations in order to enable autonomous calculations in the mobile radio terminals. Not all information is broadcast on all radio base stations but only the information useful in a geographical region considered is broadcast on some selected radio base stations of the region. These selected radio base stations are the ones used as serving radio base stations when performing positioning. The broadcast information includes identities and positions of nearby radio base stations useful as reference points for the positioning procedure and associated calculated transmission time offsets, optionally also time stamps indicating when said transmission time offsets were valid. The broadcast information is repeated periodically downlink on the selected radio base station channels and it is updated from time to time, e.g. every 5 minutes, regarding the transmission time offsets. In step 221 the broadcast information is received by a mobile radio terminal MS1 wanting to perform autonomous positioning. There is no connection in the flow between steps 216, 221 indicating that receiving is optional, when desired. The mobile radio terminal MS1 is of the type having an accessory 370 as will be described for FIG. 3 and the received information is stored in the accessory.

In step 224b the measurements made by the mobile radio terminal MS1 in step 223 are transferred to the accessory 370 and in step 225b the position of the mobile radio terminal MS1 is calculated from these measurements of step 223 and the information received in step 221. In step 227b the calculated result is shown on the liquid crystal display of the mobile radio terminal MS1 and a pip is given to call the attention of the subscriber.

Figure 3:
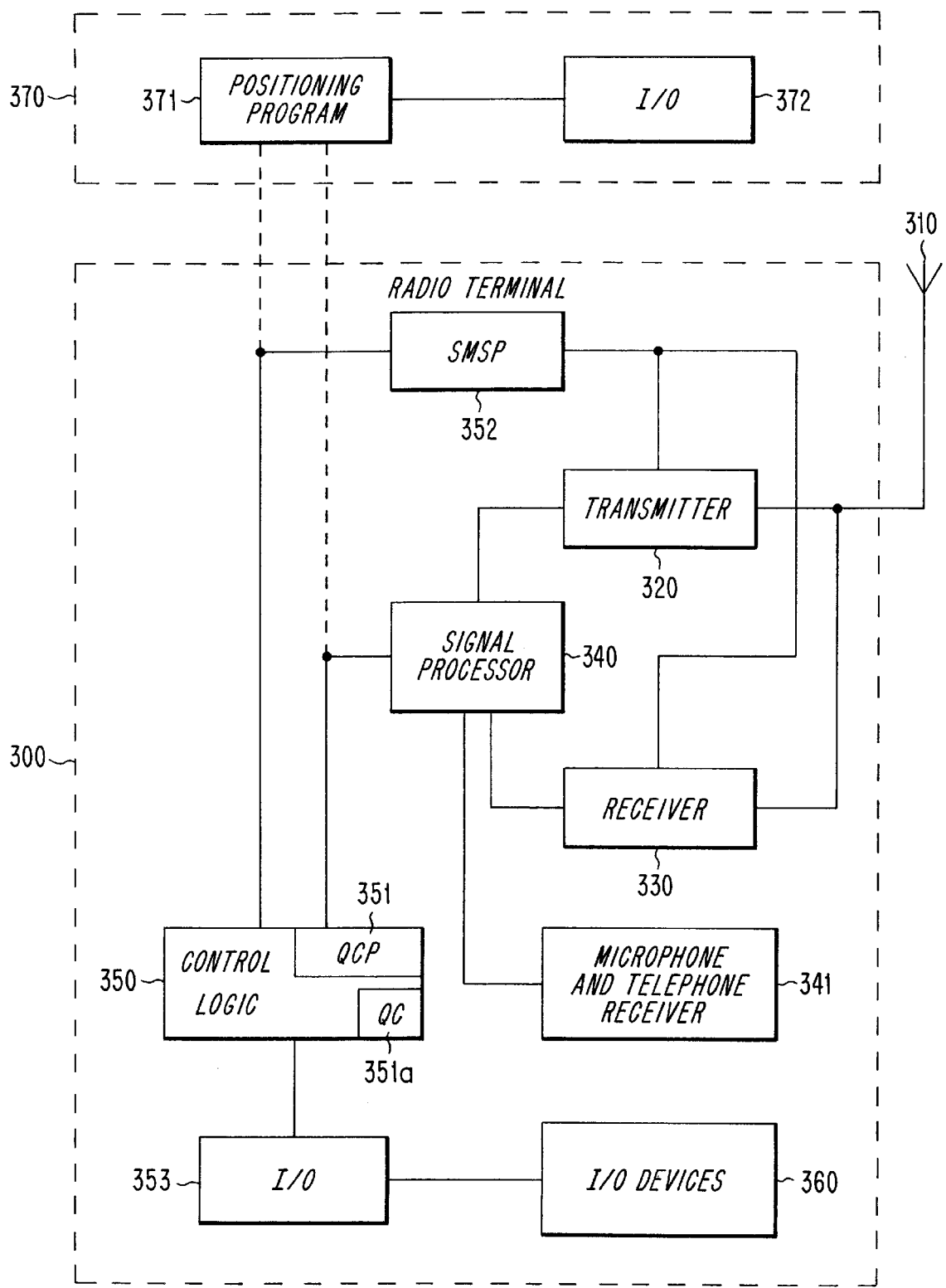
FIG. 3 is a block diagram of a mobile radio terminal according to the invention.

FIG. 3 is a block diagram which illustrates a radio terminal 300 according to the present invention. In an embodiment of this terminal the hardware is the unmodified hardware of a handheld mobile radio terminal manufactured by Ericsson such as the GH337 or CH337 or PH337 which are terminals designed for the GSM standard which is in the 900 MHz frequency band or GSM related standards in the 1900 MHz and 1800 MHz frequency bands. The invention in this embodiment includes two new programs loaded into the memory of the radio terminal. The two inventive programs are the Quarter Bit Counter Program QCP 351 and the Short Message Service Program SMSP 352. The Quarter Bit Counter Program reads the Quarter Bit Counter QC 351a available as standard in block 350 of said mobile radio terminals GH337 or CH337 or PH337 and reads also base station identity and frame number on the Synchronisation Channel SCH received via antenna 310, receiver 330 and signal processor 340.

The mobile radio terminal 300 has an antenna 310. A transmitter 320 is connected to the antenna 310 and is connected to and controlled by a signal processor 340 regarding call related functions and connected to and controlled by the inventive program SMSP 352 regarding outgoing SMS messages related to the positioning function. Similarly, a receiver is connected to the antenna and is used in time multiplex together with the transmitter. The receiver 330 is connected to and controlled by the signal processor unit 340 regarding call related functions and connected to and controlled by the inventive program SMSP 352 regarding incoming SMS messages. The blocks 320 and 330 also include radio equipment for modulating and demodulating, and equalisers.

The signal processor unit 340 includes channel coding, channel decoding and signal processing of speech in both an incoming and outgoing direction. The signal processor unit 340 is also connected to a microphone and telephone receiver in block 341, and to control logic 350. In turn, this control logic is connected to the block 352 containing the inventive program SMSP and to an I/O block 353 which adapts the signals for keypads and display windows in block 360. Modification of the radio terminal in accordance with the invention is partly realised in the form of a program 351 in the control logic 350 and this program has earlier been mentioned as the Quarter Bit Counter Program QCP.

Belonging to the embodiment described in FIG. 2b there is a detached section 370 at the top of FIG. 3 containing a processor and positioning program 371 and an I/O block 372. The detached section 370 is a calculating node of this embodiment which has part of the calculation function decentralised to the mobile radio terminal itself. It is possible to place this calculating node in or near the radio terminal MS1 that is to be positioned, as this is done in the case of a radio terminal in the earlier mentioned satellite based General Positioning System GPS. In the present decentralised embodiment an accessory 370 is provided by the invention either physically detached or integrated with the mobile radio terminal 300. The positioning program in the block 371 is connected to the short message service program block SMSP and to the measuring program block QCP. The measurements may be ordered from the section 370 by manually entering the desired orders on I/O block 372. This decentralised embodiment differs from the embodiment only having a calculating node in the wirebound network by the fact that the short message service program block SMSP handles via receiver 330 and antenna 310 only downlink SMS messages coming from the service node 107 via the serving radio base stations BS2. Block 352 receives these downlink messages and conveys them to block 371.

Figure 4:
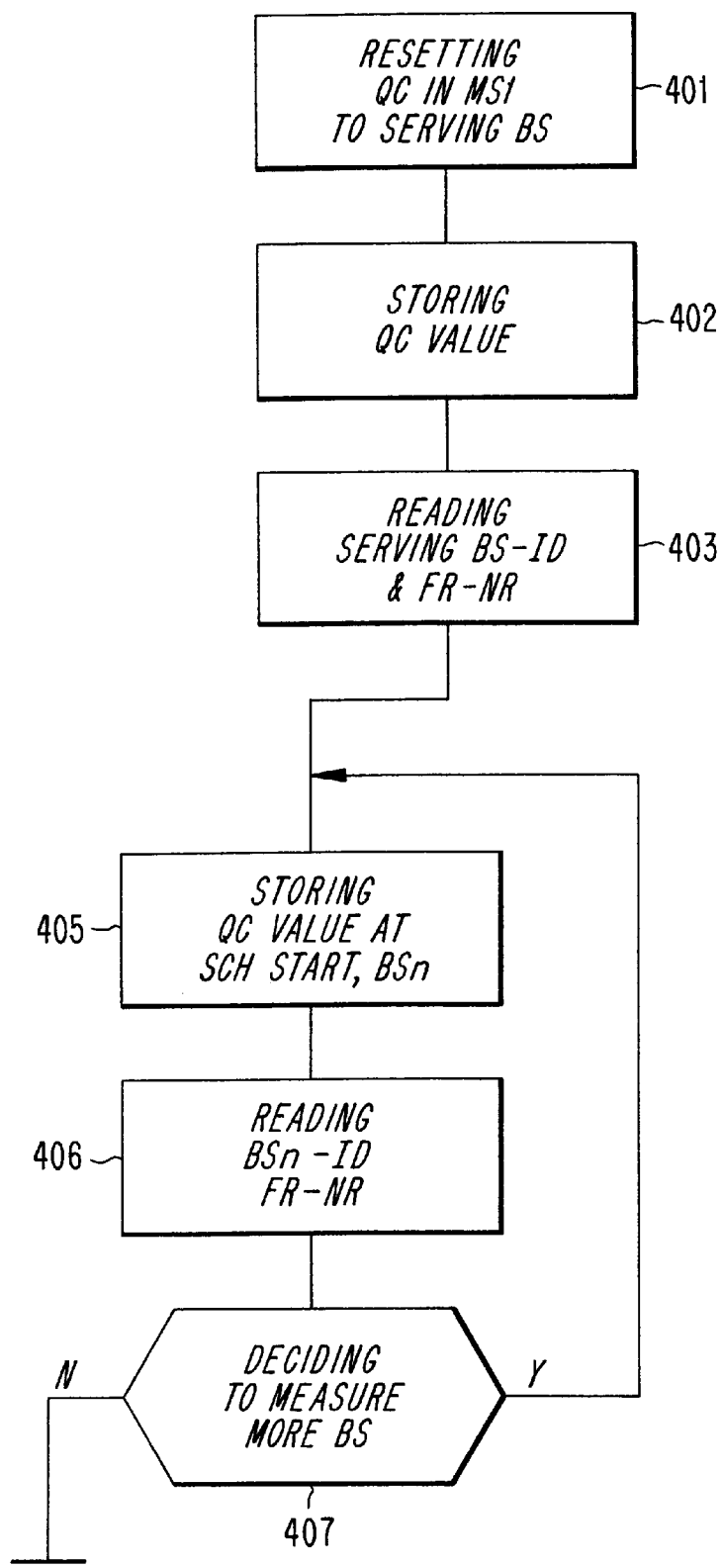
FIG. 4 is a flow chart for the details of a measuring at MS1 step in the flow chart of FIGS. 2a, 2b.

FIG. 4 is a flow chart for the details of a measurement corresponding to steps 212,213 and 222,223 performed by the radio terminal 300 in the role as MS1 or MS2 in the embodiments of FIGS. 2a and 2b. FIG. 5 illustrates timing associated with the flow chart of FIG. 4. The flow of FIG. 4 will now be described considering synchronising 222 and measuring 223 performed by the mobile radio terminal MS1 in the flow of FIG. 2a. The start is given by the service node 107 asking for measurements to be performed by the mobile radio terminal MS1, these measurements determining in MS1 the relative receive times of radio base station BS1 and BS3 relative serving radio base station BS2. In an implementation with the GSM standard these measurements are done as described below. When the mobile radio terminal MS1 is switched on it scans the control channel frequencies of the surrounding radio base stations and locks to the strongest one, BS2 in the case of FIG. 1, which thereby becomes the serving radio base station. The mobile radio terminal then synchronises in step 401 to the serving radio base station BS2 which may be implemented by resetting the counter QC in the mobile radio terminal MS1 at the beginning of (time slot T0 of) a frame of BS2. At this moment in step 402 the program QCP 351 stores the value Nq of the counter QC in mobile radio terminal MS1. The value Nq may be required for the calculations in case more than one serving radio base station participate in the algorithm for positioning the mobile radio terminal MS1, the difference between the respective Nq values stored in mobile radio terminal MS1 allowing to relate the timing of the more than one serving radio base stations. The details of the synchronisation procedure including the Quarter Bit Counter QC and its function may be read in ETSI/GSM recommendation 05.10/1 through 05.10/6 of Version. 3.5.0.

Figure 5:
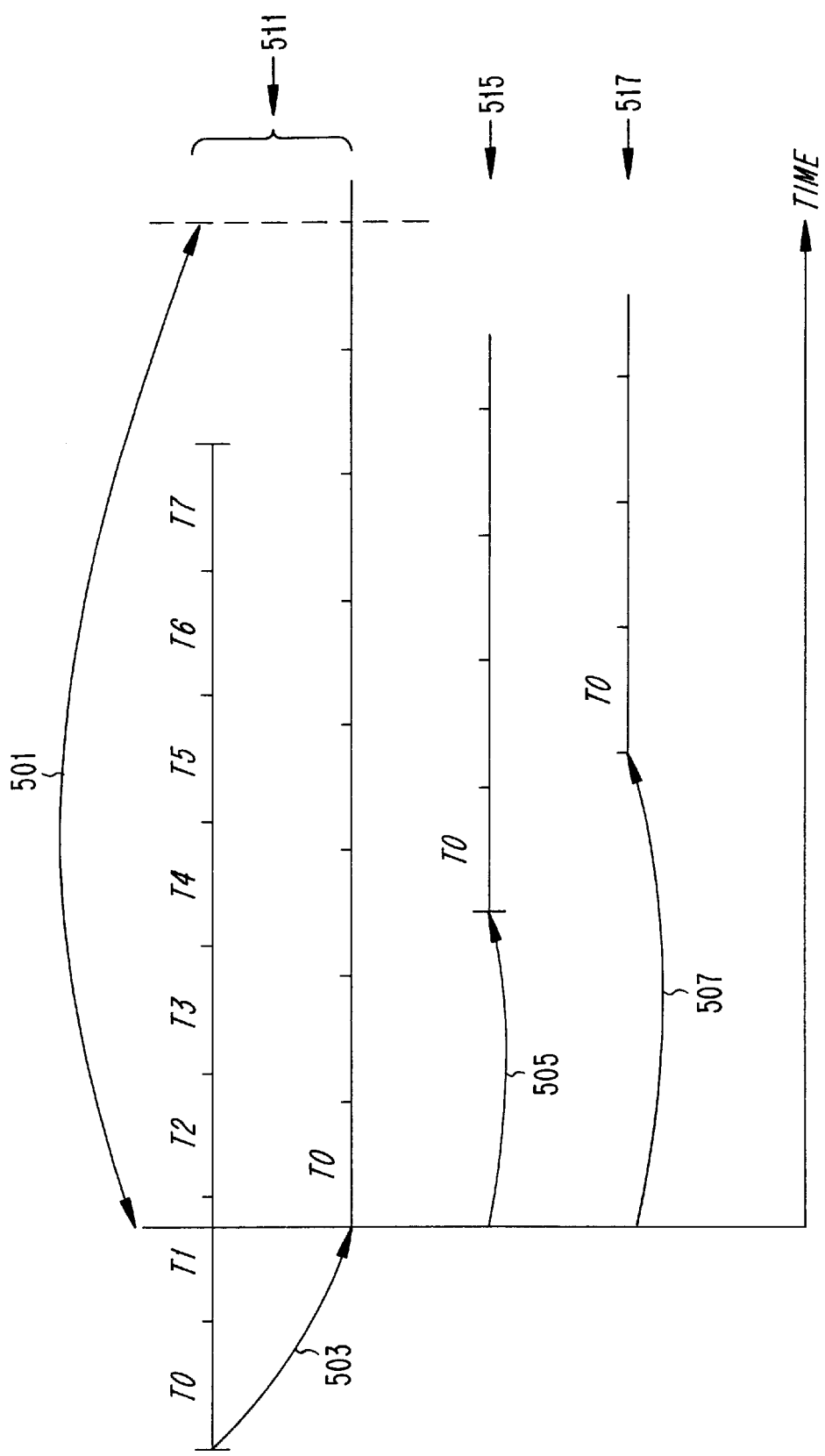
FIG. 5 is a timing diagram for the details of a measuring procedure as shown in FIG. 4.

In FIG. 5 the value Nq is shown as the time 503. A frame has 8 time slots T0–T7 and the duration of a frame is shown as the time 501. The action of synchronising the mobile radio terminal MS1 to the radio base station BS2 is represented in FIG. 5 with the reference 511 indicating the time shift Nq 503, corresponding to the resetting of the QC counter in MS1.

In step 403 the mobile radio terminal MS1 that is now synchronised to the serving radio base station BS2 reads the Frequency Correction Channel FCCH and the Synchrconising Channel SCH of BS2. The reading is done more precisely on timeslot T0 which carries among other the above mentioned local channels FCCH and SCH. The reading includes the identity of the radio base station BS2-ID and the frame number FR-NR. The frame number FR-NR is otherwise used in conjunction with encryption but regarding the present invention it allows supervising when something unusual occurs such as a restart of a radio base station which makes measurements useless if involving the time before and after such an event. Such measurements are discarded by the positioning algorithm if indicated by the frame number FR-NR.

In step 405 the mobile radio terminal MS1 performs the measurements described in steps 402,403 but e.g. for radio base station BS3 rather than BS2. However, since the start time of a frame received from BS3 is different from the start time of a frame received from BS2 there is an additional measurement in step 405 which was not made in step 403. This measurement of the relative receive time of BS3 relative BS2 is measured in MS1 by means of the afore mentioned Quarter Bit Counter QC which counts from 0–4999 starting and ending with the frame borders of the mobile radio station MS1 and being read at the time of the received frame border of BS3. Since MS1 has been synchronised to BS2 in step 401 the described reading Nq of the QC counter is the relative receive time of BS3 relative BS2.

In step 406 readings of the radio base station identity BSn-ID and the frame number FR-NR are taken in a similar way as in step 403 but now for radio base station BS3. In step 407 a decision is taken as whether to measure on more radio base stations as e.g. BS1 and if so the flow returns to step 405, otherwise the flow terminates.

In FIG. 5 the timing of radio base station BS3 is shown with reference 517 and the timing of radio base station BS1 with reference 515 whereby the measured relative receive time between BS2 and BS3 is designated 507 and the measured relative receive time between BS2 and BS1 is designated 505.

The measuring procedure described above takes place in the idle mode or even in dedicated mode i.e. with or without an ongoing call. This is possible because in GSM there is a so called idle time slot every 26 frames allowing to perform time measurements on other radio base stations than the serving radio base station even during a call.

For details of the GSM system reference is made to the Global System for Mobile communication (GSM) specification standardised by the European Telecommunication Standards Institute ETSI and to the book: The GSM System for Mobile Communication, by Michel Mouly and Marie Bernadette Pautet (International Standard Book Number 2-9507190-0-7).

Figure 6:
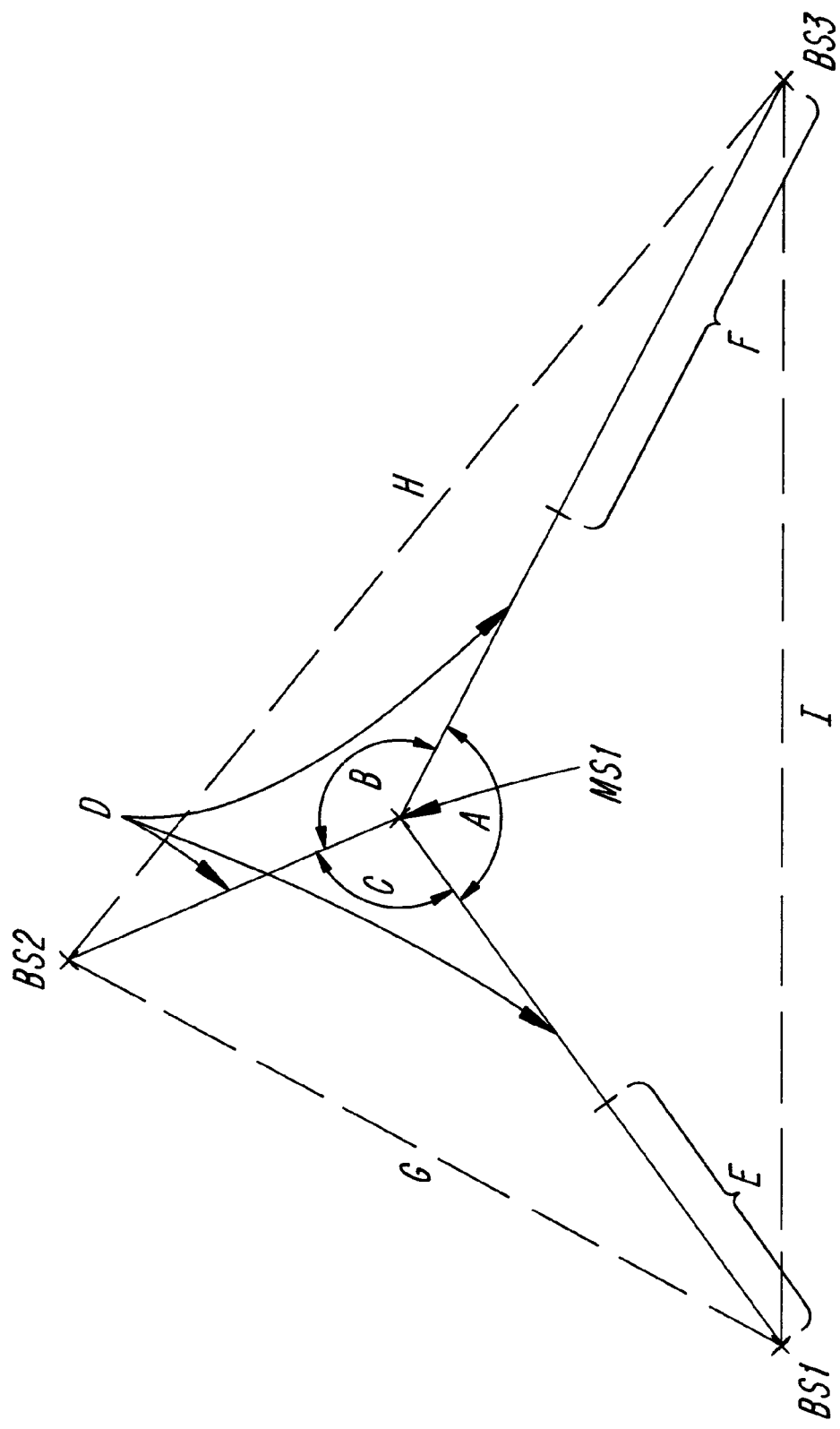
FIG. 6 shows the mathematical principle of calculating the position of a mobile radio terminal.

FIG. 6 shows the mathematical principle of calculating the position of a mobile radio terminal MS1 located in the middle of the triangle. The positions of and the distances between the radio base stations BS1, BS2, BS3 are known and they are designated G,H and I in the figure. The relative receive times BS1 relative BS2 and BS3 relative 13S2 have been measured by the mobile radio terminal MS1 and reported to the service node . The corresponding measurements by a fixed radio terminal MS2 have been used to calculate the transmission time offsets between the radio base stations. The distance F in FIG. 6 may be interpreted as the speed of light multiplied by the relative receive time at the mobile radio terminal MS1 between radio base station BS3 and serving radio base station BS2, if these radio base stations had been synschronous. Since they are not (the normal case) the transmission time offset of BS3 relative BS2 is used to calculate F by first subtracting the transmission time offset from the relative receive time. E is calculated in an analogous way.

The mathematics of the algorithm apply the cos-theorem as explained in the following referring to FIG. 6. Known parameters: G,H,I,E,F. To be calculated: D Equations to be solved by known numerical methods:

Angles $A+B+C=360$ degrees  (1)

$H^{}2=D^{}2+(D+F)^{**}2-2D(D+F)\cos B$  (2)

$G^{}2=D^{}2+(D+E)^{**}2-2D(D+E)\cos C$  (3)

$I^{}2=(D+E)^{}2+(D+F)^{**}2-2(D+E)(D+F)\cos A$  (4)

Figure 7A:
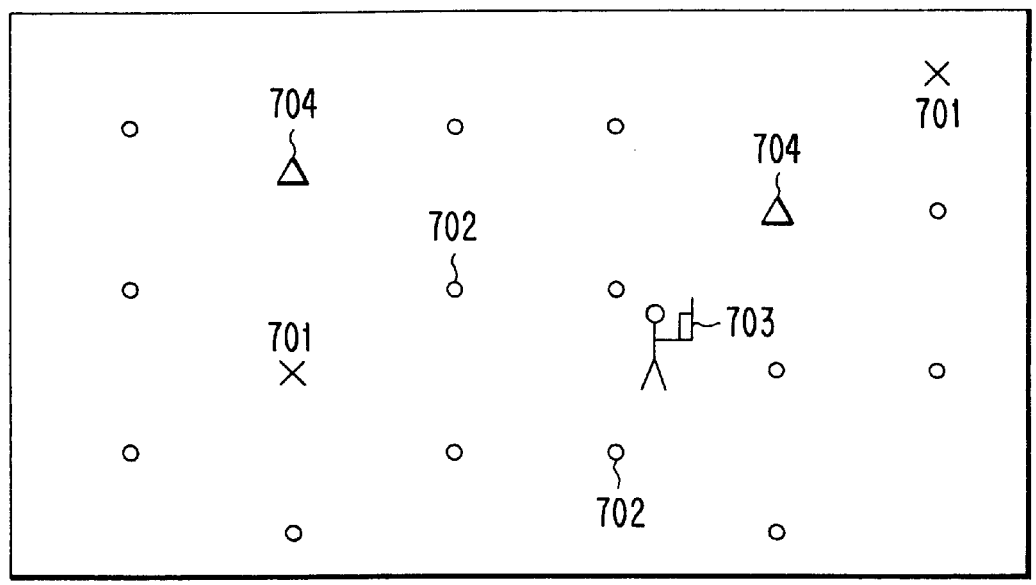
FIG. 7a shows schematically a supermarket area with additional radio base stations to provide improved positioning accuracy.

FIG. 7a shows schematically a supermarket area with two normal radio base stations 701 which may be used by the visitors of the market for mobile radio telephone calls. In addition there are 14 additional beacon type radio base stations 702 capable of downlink signalling only on so called beacon channels. These radio base stations have been provided merely to enable more accurate positioning and they do not have a function associated with telephone traffic. The subscriber to be positioned having a handheld mobile radio terminal MS1 has been labeled 703 and the two fixed mobile radio terminals MS2 have been labeled 704.

Figure 7B:
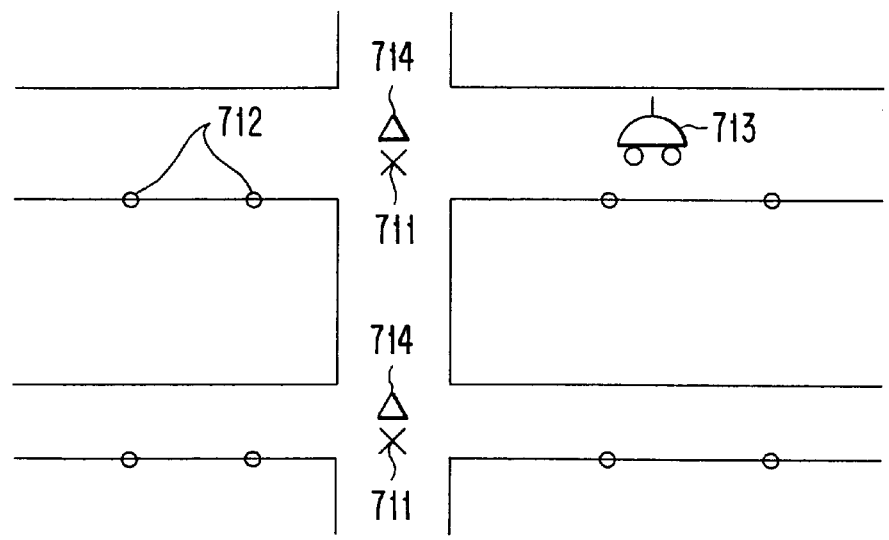
FIG. 7b shows schematically a downtown area with additional radio base stations to provide improved positioning accuracy.

FIG. 7b shows schematically a downtown area with two normal radio base stations 711 which may be used for mobile radio telephone calls. In addition there are 8 additional beacon type radio base stations 712 capable of downlink signalling only on beacon channels. These radio base stations have been provided merely to enable more accurate positioning and they do not have a function associated with telephone traffic. The subscriber to be positioned having a car and handheld mobile radio terminal MS1 has been labeled 713 and the two fixed mobile radio terminals MS2 have been labeled 714.

FIGS. 7a and 7b show embodiments of the invention where accuracy is improved by providing additional radio base stations capable of downlink signalling only, i.e. each having a so called beacon channel only. These embodiments differ from the earlier described ones where improved accuracy was achieved by iterating in the positioning algorithm whereas the embodiments 7a and 7b improved accuracy is achieved by increasing radio base station density. Tutorial information on beacon channels may be found e.g. in the book by Mouly and Pautet referenced earlier.

FIG. 8 shows schematically a fixed radio terminal 300 of the same type as in FIG. 3 with an accessory 801 consisting of a beacon type radio base station. The geographical position of the radio terminal 300 is preferably determined on a map but it is alternatively possible to use the positioning method described earlier for mobile radio terminals to determine said position. The fixed radio terminal 300 controls the beacon type radio base station but may be used in addition as a fixed radio terminal MS2 for determining transmission time offsets of surrounding radio base stations.

The accessory 801 is a stripped radio base station capable of sending periodic timing signals downlink on a beacon type frequency channel the frequency of which is ordered by a message received by the fixed radio terminal 300 and transferred to the processor 802 in the accessory 801 where the message is stored, interpreted and executed by setting the beacon frequency contained in the order, in the transmitter 803. An antenna 804 transmits the said beacon channel. The interface between the radio terminal 300 and the accessory 801 is the same as shown in FIG. 3 and the same program SMSP 352 is used for the communication between the radio terminal 300 and the accessory 801 and for communicating with the network. The orders come from the service node 107 in the network and are entered into the service node by the operator of the positioning system. It is known to those of ordinary skill in the art how the mentioned radio base station 801 and its elements are implemented and therefore no further details are described.

The invention is not limited to the here described and in the figures illustrated embodiments but may vary within the scope of the enclosed claims.

We claim:

1. A method for determining a geographical position of a first mobile radio terminal in a mobile radio system comprising at least three radio base stations at least a second radio terminal at a fixed position and a service node in which are stored the known positions of said at least three radio base stations and said at least one second radio terminal comprising the following steps:

synchronising said second radio terminal to timing signals downlink received from a first one of said at least three radio base stations;

measuring at said second radio terminal relative receive times of said timing signals downlink received from remaining radio base stations while also reading identities of said at least three radio base stations;

sending the relative receive times measured at said second radio terminal and associated radio base station identities to said service node;

calculating at said service node transmission time offsets of said timing signals downlink from said relative receive times and said known positions;

synchronising said first mobile radio terminal to timing signals downlink received from an arbitrary one among said at least three radio base stations;

measuring at said first mobile radio terminal relative receive times of said timing signals downlink received from remaining radio base stations while also reading said at least three radio base station's identity;

sending the relative receive times measured at said first radio terminal and associated radio base station identities to said service node;

calculating at said service node the position of said first mobile radio terminal from said stored positions and from measurements and identities sent from said first and second radio terminals to said service node.

2. A method according to claim 1, including the following additional steps:

repeating at intervals the step of measuring the relative receive times at said second radio terminal;

time stamping said measurements at said second mobile radio terminal;

sending said time-stamping of said measurements to said service node;

extrapolating transmission time offsets to the actual time of the calculation by making use of said time stamping said measurements and of the time elapsed since said measurements were made.

3. A method according to claim 1, whereby said second radio terminal is located at one of said at least three radio base stations.

4. A method according to claim 1, whereby said service node is a service node in the wire-bound part of the network and handles the calculation for a plurality of mobile radio terminals.

5. A method according to claim 4, whereby said service node sends results of the calculations to the first mobile radio terminal.

6. A method according to claim 1, comprising the step of synchronising a mobile radio terminal to a serving radio base station, comprising the sub-steps of:
   resetting a counter in said mobile radio terminal thereby synchronising to said serving radio base station;
   storing the reset value of said counter in said mobile radio terminal;
   reading in said mobile radio terminal on the synchronisation channel SCH of said serving radio base station the radio base station identity and the current frame number.

7. A method according to claim 1, comprising the step of measuring at said radio terminal relative receive times of the timing signals downlink of other radio base stations than said serving radio base station comprising the sub-steps of:
   storing the value of a counter in said mobile radio terminal at the instant the frame of said other radio base station begins;
   reading in said mobile radio terminal on the synchronisation channel SCH of said other radio base station the radio base station identity and the current frame number;
   deciding if more other radio base stations are to be measured and if so loop back to the sub-step of storing.

8. A method according to claim 1, improving the accuracy of positioning by the steps of:
   checking after a first execution of the positioning method whether there are any radio base stations in the network which may yield a more accurate positioning than the at least three radio base stations used in said first execution of the positioning and whether more accurate positioning is desirable;
   performing, if indicated by the previous step of checking, a further execution of the positioning method using at least one radio base station identified in the previous step of checking.

9. A method according to claim 1, in the case the land system has no information about the identity of the serving radio base station associated with a terminal to be positioned, providing the steps of:
   sending a message to the mobile radio terminal to be positioned;
   receiving from said mobile radio terminal to be positioned an answer via its serving radio base station the answer identifying said serving radio base station.

10. A method for determining a geographical position of a first mobile radio terminal in a mobile radio system comprising at least three radio base stations at least a second radio terminal at a fixed position, a service node in which are stored the known positions of said at least three radio base stations and said at least one second radio terminal and an accessory associated with said first mobile radio terminal comprising the following steps:
   synchronising said second radio terminal to timing signals downlink received from a first one of said at least three radio base stations;
   measuring at said second radio terminal relative receive times of said timing signals downlink received from remaining radio base stations while also reading said at least three radio base station's identity;
   sending the relative receive times measured at said second radio terminal and associated radio base station identities to said service node;
   calculating at said service node transmission time offsets of said timing signals downlink from said relative receive times and said known positions;
   broadcasting the known positions of said at least three radio base stations and said respective transmission time offsets provided in the previous step of calculating;
   receiving said known positions and respective transmission time offsets of the previous step of broadcasting in said accessory of said first mobile radio terminal;
   synchronising said first radio terminal to timing signals downlink received from an arbitrary one among said at least three radio base stations;
   measuring at said first mobile radio terminal relative receive times of said timing signals downlink received from remaining radio base stations while also reading said at least three radio base station's identity;
   transferring the relative receive times measured at said first radio terminal and associated radio base station identities to said accessory of said first radio terminal;
   calculating in said accessory the position of said first mobile radio terminal from the information provided in the steps of receiving and transferring.

11. A method according to claim 10, including the following additional steps:
   repeating at intervals the step of measuring the relative receive times at said second radio terminal;
   time stamping said measurements at said second mobile radio terminal;
   sending said time-stamping of said measurements to said service node;
   extrapolating transmission time offsets to the actual time of the calculation by making use of said time stamping said measurements and of the time elapsed since said measurements were made.

12. A method according to claim 10, whereby said second radio terminal is located at one of said at least three radio base stations.

13. A method according to claim 10, hereby said service node is a service node in the wire-bound part of the network and handles the calculation for a plurality of mobile radio terminals.

14. A method according to claim 10, comprising the step of synchronising a mobile radio terminal to a serving radio base station, comprising the sub-steps of:
   resetting a counter in said mobile radio terminal thereby synchronising to said serving radio base station;
   storing the reset value of said counter in said mobile radio terminal;
   reading in said mobile radio terminal on the synchronisation channel SCH of said serving radio base station the radio base station identity and the current frame number.

15. A method according to claim 10, comprising the step of measuring at said radio terminal relative receive times of the timing signals downlink of other radio base stations than said serving radio base station comprising the sub-steps of:
   storing the value of a counter in said mobile radio terminal at the instant the frame of said other radio base station begins;
   reading in said mobile radio terminal on the synchronisation channel SCH of said other radio base station the radio base station identity and the current frame number;

deciding if more other radio base stations are to be measured and if so loop back to the sub-step of storing.

16. A mobile radio system comprising at least three radio base stations sending timing signals downlink and at least a first mobile radio terminal the geographical position of which is to be determined, comprising:

at least a second radio terminal at a fixed position receiving said timing signals downlink;

a service node having stored in it known positions of said at least three radio base stations and of said at least second radio terminal;

measuring means in said at least first and at least second radio terminals for measuring relative receive times of said timing signals downlink and reporting them to said service node;

first calculating means in said service node for calculating transmission time offsets, from said known positions and said relative receive times reported by said at least second radio terminal;

second calculating means in said service node for calculating the position of said first mobile radio terminal from said known positions of said at least three radio base stations, from said transmission time offsets and from relative receive times sent by said first mobile radio terminal.

17. A system according to claim 16, wherein said second mobile radio terminal being located at a base station site.

18. A system according to claim 16, wherein radio base stations send downlink a Frequency Correction Channel FCCH and a Synchronisation Channel SCH which may be read during idle and dedicated modes and wherein the mobile radio terminals synchronise to the serving radio base station and can read said Synchronisation Channel of other radio base stations than said serving radio base station, comprising:

measuring means for reading in said radio terminals on the Synchronisation Channel SCH of said other radio base stations than said serving radio base station the base station identity and the current frame number and reading on a counter in said second and first mobile radio terminals the relative receive time of said other radio base stations relative to the beginning of a frame of said serving radio base station;

wherein if the radio terminal is in dedicated mode reading on said counter is performed during an idle time slot in the radio terminal.

19. A system according to claim 16, with at least one radio base station in the system further comprising:

means for sending on a beacon channel periodic timing signals downlink to facilitate positioning of mobile radio terminals;

means for receiving from a service node in the network orders relating to at least the setting of the frequency of said beacon channel.

20. A system according to claim 16, with simplified calculations of the position of radio terminals the simplification being obtained by synchronising some but not all radio base stations of the positioning system.

21. A mobile radio system comprising at least three radio base stations sending timing signals downlink and at least a first mobile radio terminal the geographical position of which is to be determined, comprising:

at least a second radio terminal at a fixed position receiving said timing signals downlink;

a service node having stored in it known positions of said at least three radio base stations and of said at least second radio terminal;

measuring means in said at least first and at least second radio terminals for measuring relative receive times of said timing signals downlink and reporting them to said service node;

first calculation means in said service node for calculating transmission time offsets, from said known positions and said relative receive times reported by said at least second radio terminal;

sending means for sending from said service node to said first mobile radio terminal said known positions of said at least three radio base stations and associated transmission time offsets;

second calculating means in said at least first mobile radio terminal for calculating its own position from said known positions of said at least three radio base stations and associated transmission time offsets and from relative receive times transferred by said first mobile radio terminal.

22. A system according to claim 21, wherein said second mobile radio terminal being located at a base station site.

23. A system according to claim 21, wherein radio base stations send downlink a Frequency Correction Channel FCCH and a Synchronisation Channel SCH which may be read during idle and dedicated modes and wherein the mobile radio terminals synchronise to the serving radio base station and can read said Synchronisation Channel of other radio base stations than said serving radio base station, comprising:

measuring means for reading in said radio terminals on the Synchronisation Channel SCH of said other radio base stations than said serving radio base station the base station identity and the current frame number and reading on a counter in said second and first mobile radio terminals the relative receive time of said other radio base stations relative to the beginning of a frame of said serving radio base station;

wherein if the radio terminal is in dedicated mode reading on said counter is performed during an idle time slot in the radio terminal.

24. A system according to claim 21, with at least one radio base station in the system further comprising:

means for sending on a beacon channel periodic timing signals downlink to facilitate positioning of mobile radio terminals;

means for receiving from a service node in the network orders relating to at least the setting of the frequency of said beacon channel.

25. A system according to claim 21, with simplified calculations of the position of radio terminals the simplification being obtained by synchronising some but not all radio base stations of the positioning system.

26. A radio terminal comprising:

measuring means for measuring during idle mode and conversation mode the relative receive times between periodic timing signals downlink received from a considered radio base station and periodic timing signals downlink received from a serving radio base station when said mobile radio terminal is synchronised to said serving radio base station;

reading means for reading during idle mode and conversation mode the Frequency Correction Channel FCCH and Synchronisation Channel SCH including reading the identity and frame number transmitted by said considered radio base station;

messaging means for messaging during idle mode and conversation mode measured relative receive times and read identities and frame numbers to a service node.

27. A radio terminal according to claim 26, further comprising: messaging means for receiving in said radio terminal position information, transmission time offset information and identity information regarding radio base stations;

wherein said information regarding radio base stations is provided as broadcast downlink information from at least some among the radio base stations.

28. A mobile radio terminal according to claim 27, further comprising:

second calculating means for calculating its own position;

wherein the mobile calculating its own position makes use of downlink information streams only.

29. A radio terminal according to claim 26, further comprising:

messaging means for receiving in said radio terminal position information, transmission time offset information and identity information regarding radio base stations;

wherein said information regrading radio base stations is provided as individual messages, preferably of Short Message Service SMS type, addressed to said radio terminal.

30. A mobile radio terminal according to claim 29, further comprising:

second calculating means for calculating its own position;

wherein the mobile calculating its own position makes use of downlink information streams only.

31. A mobile radio terminal according to claim 29, wherein said measuring means, said reading means, said messaging means for messaging and said messaging means for receiving are implemented as a processor with programs located in a first mobile radio terminal to be positioned and in a second mobile radio terminal the position of which is known.

32. A mobile radio terminal according to claim 29, wherein said measuring means comprises a Quarter Bit Counter and wherein a resolution of the Quarter Bit Counter is increased by using a higher frequency as an input to the counter and by using correspondingly more bits in said counter thereby counting to more than 4999.

33. A mobile radio terminal according to claim 26, further comprising:

second calculating means for calculating its own position;

wherein the mobile calculating its own position makes use of downlink information streams only.

34. A mobile radio terminal according to claim 33, wherein said measuring means comprises a Quarter Bit Counter and wherein a resolution of the Quarter Bit Counter is increased by using a higher frequency as an input to the counter and by using correspondingly more bits in said counter thereby counting to more than 4999.

35. A mobile radio terminal according to claim 27, wherein said measuring means, said reading means, said messaging means for messaging and said messaging means for receiving are implemented as a processor with programs located in a first mobile radio terminal to be positioned and in a second mobile radio terminal the position of which is known.

36. A mobile radio terminal according to claim 27, wherein said measuring means comprises a Quarter Bit Counter and wherein a resolution of the Quarter Bit Counter is increased by using a higher frequency as an input to the counter and by using correspondingly more bits in said counter thereby counting to more than 4999.

37. A mobile radio terminal according to claim 26, wherein said measuring means, said reading means and said messaging means are implemented as a processor with programs located in a first mobile radio terminal to be positioned and in a second mobile radio terminal the position of which is known.

38. A mobile radio terminal according to claim 26, wherein said measuring means comprises a Quarter Bit Counter and wherein a resolution of the Quarter Bit Counter is increased by using a higher frequency as an input to the counter and by using correspondingly more bits in said counter thereby counting to more than 4999.

39. A mobile radio terminal according to claim 37, wherein said measuring means comprises a Quarter Bit Counter and wherein a resolution of the Quarter Bit Counter is increased by using a higher frequency as an input to the counter and by using correspondingly more bits in said counter thereby counting to more than 4999.

40. A service node in a mobile radio network this network comprising at least three radio base stations sending timing signals downlink at least one first mobile radio terminal the geographical position of which is to be determined, at least one second fixed radio terminal said service node comprising:

receiving means for receiving measurement reports from said at least one fixed radio terminal of relative receive times of timing signals downlink transmitted by said at least three radio base stations;

storing means for storing known geographical positions of said at least three radio base stations and of said at least one second fixed radio terminal;

first calculating means for calculating from measurement reports from said at least one fixed radio terminal and from said known geographical positions transmission time offsets of the timing signals downlink transmitted by said at least three radio base stations.

41. A service node according to claim 40, further comprising:

receiving means for receiving measurement reports from said first mobile radio terminal of relative receive times of timing signals downlink transmitted by said at least three radio base stations;

second calculating means for calculating the geographical position of said first mobile radio terminal from said transmission time offsets, said known geographical positions and said received measurement reports from said first mobile radio terminal.

42. A service node according to claim 40, further comprising:

sending means for sending said known geographical positions and said transmission time offsets to radio base stations for broadcasting to said first mobile radio terminal.

* * * * *